US012675067B2

(12) United States Patent
Weedlun et al.

(10) Patent No.: US 12,675,067 B2
(45) Date of Patent: Jul. 7, 2026

(54) DIGITALLY PRINTED AND PRODUCED HEAT TRANSFER AND METHOD OF MANUFACTURE

(71) Applicant: Avery Dennison Retail Information Services LLC, Mentor, OH (US)

(72) Inventors: Paul Weedlun, Fulton, MD (US); Owen McGovern, Columbia, MD (US); Gillian Ross, Ellicott City, MD (US); Stephen Mynott, Towson, MD (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 26 days.

(21) Appl. No.: 17/966,376

(22) Filed: Oct. 14, 2022

(65) Prior Publication Data

US 2023/0118044 A1 Apr. 20, 2023

Related U.S. Application Data

(63) Continuation of application No. 16/582,124, filed on Sep. 25, 2019, now abandoned.

(51) Int. Cl.
*B05D 1/36* (2006.01)
*B05D 3/02* (2006.01)
(Continued)

(52) U.S. Cl.
CPC .......... *G03G 15/2007* (2013.01); *B05D 1/36* (2013.01); *B05D 3/0263* (2013.01); (Continued)

(58) Field of Classification Search
CPC ................................ B05D 1/36; B05D 3/0263
See application file for complete search history.

(56) References Cited

U.S. PATENT DOCUMENTS 8,236,122 B2 8/2012 Kronzer
9,227,451 B2 1/2016 Dolsey et al.
(Continued)

OTHER PUBLICATIONS

Product Safety Summary, Aromatic 100 Fluid, Exxon Mobile, Feb. 2021.

*Primary Examiner* — Dah-Wei D. Yuan
*Assistant Examiner* — Kristen A Dagenais

(57) ABSTRACT

A process for producing a digital printed heat transfer, the process comprising the steps of: 1) obtaining a substrate having a release layer; 2) applying a primer suitable for electrophotographic toner to the release layer; 3) digitally-printing electrophotographic toner to define a graphic within a defined region of a substrate inclusive of both printed and unprinted areas within that region; 4) digitally printing a tacky viscoelastic binder in registration with the printed areas of the digitally-printed graphic; 5) applying a polyurethane-based powder adhesive to the defined region of said substrate; 6) removing loose powder adhesive that does not adhere to the defined regions of said graphic; and 7) fusing and bonding the adhesive to the digital printed graphic. The binder precisely secures the adhesive powder to the printed graphical areas. The result is then cooled to set the image for use as a heat transfer.

9 Claims, 1 Drawing Sheet

(51) Int. Cl.

| | |
|---|---|
| ***B05D 5/00*** | (2006.01) |
| ***B41M 7/00*** | (2006.01) |
| ***G03G 15/16*** | (2006.01) |
| ***G03G 15/20*** | (2006.01) |

(52) U.S. Cl.

CPC ............. *B05D 3/0272* (2013.01); *B05D 5/00* (2013.01); *B41M 7/0027* (2013.01); *G03G 15/161* (2013.01); *G03G 15/2053* (2013.01); *B05D 2401/10* (2013.01); *B05D 2401/20* (2013.01); *B05D 2401/21* (2013.01); *B05D 2401/32* (2013.01); *B05D 2503/00* (2013.01); *B05D 2505/00* (2013.01); *B05D 2507/00* (2013.01); *B05D 2508/00* (2013.01); *B41M 2205/10* (2013.01); *G03G 2215/00666* (2013.01); *G03G 2215/2019* (2013.01)

(56) References Cited

U.S. PATENT DOCUMENTS

| | | | | |
|---|---|---|---|---|
| 9,315,681 | B2 * | 4/2016 | Xu ....................... | C09D 11/328 |
| 9,799,238 | B2 | 10/2017 | Daley et al. | |
| 11,130,364 | B2 | 9/2021 | McGovern et al. | |
| 2004/0161688 | A1 * | 8/2004 | Itakura ............... | G03G 9/08702 399/329 |
| 2008/0043087 | A1 | 2/2008 | Cowan | |
| 2010/0238252 | A1 | 9/2010 | Dinescu et al. | |
| 2011/0053450 | A1 | 3/2011 | Baqai et al. | |
| 2013/0287972 | A1 | 10/2013 | Tetrault et al. | |
| 2015/0010337 | A1 * | 1/2015 | Morinaga .......... | G03G 15/2021 399/341 |
| 2016/0358519 | A1 * | 12/2016 | Daley ................... | B44C 1/1712 |
| 2019/0121279 | A1 * | 4/2019 | Tzomik .................. | G03G 15/10 |
| 2019/0378438 | A1 * | 12/2019 | Penrose .................... | G09F 3/10 |

* cited by examiner

DIGITALLY PRINTED AND PRODUCED HEAT TRANSFER AND METHOD OF MANUFACTURE

CROSS-REFERENCE TO R ELATED APPLICATION(S)

The present application derives priority from U.S. patent application Ser. No. 16/582,124 filed Sep. 25, 2019.

BACKGROUND OF THE INVENTION

1. Field of the Invention

The present invention relates to the creation of photographic quality heat activated transfers and appliqués and, particularly, to a light-weight electrophotographically printed heat-transfer comprised of numbers, letters, logos, graphics, and other indicia.

2. Description of the Background

Heat transfers are well-known and commonly used to transfer a graphic, such as text or a figure, onto an item, such as apparel or merchandise. A transfer sheet (a.k.a. release sheet) is usually pre-printed with a graphic, and then the graphic is transferred from the transfer sheet to the item using a heated platen, iron or the like.

To manufacture heat transfers it is typical to apply a release layer to the transfer sheet before the graphic is printed, then print the graphic atop the release layer, and then coat the adhesive over the top surface of the graphic. When a user then applies the graphic to the item, the graphic transfer is turned adhesive-side down onto the item and heat is applied to the release sheet to transfer the graphic to the item from the release layer of the release sheet. There are a wide variety of techniques for printing onto the release layer, including analog methods such as gravure printing, offset printing, flexographic printing, screen printing, and digital methods such as inkjet printing and more recently, electrophotographic printing (printing technique used in laser and LED printers and most copier machines that electrostatically charges a drum with an image, which then attracts toner, and then transfers the toner/image to a substrate). Despite the myriad printing techniques there are typically only two processes for applying the thermal adhesive in-register to the printed graphic. The first is directly screen printing a thermal adhesive onto the printed graphic. The second is screen printing a polymeric ink or coating, most commonly polyvinylchloride (PVC) plastisol ink or water-based ink comprised of acrylic resin and polyurethane, in register to the printed graphic and then submerging the release sheet in a thermal adhesive powder where the powder selectively adheres to the still wet ink/coating (see, U.S. Pat. No. 9,799,238 to Daley at column 4, lines 16-31 and FIG. 2. A polymeric coating is applied over the digital image, and "while the coating is still wet, polymeric adhesive powders are applied to the digital image." Adhesive particles that are adhered to the wet ink remain on the label. Although Daley mentions an HP Indigo™ printer, this process applies a dry toner film through thermal offset. Daley explicitly requires a wetting agent for adhesion of the powder to the printed image (such that the shape and distribution of adhesive is specific to each printed graphic). Consequently, the distinction between wet ink versus dry toner becomes very important because wetting agents must be screen or inkjet printed. Wet printing techniques are not desirable because the liquid penetrates into the substrate and loses registration. Moreover, when screen printing a unique silkscreen blocking stencil is necessary for each graphic. This requires a cumbersome offline process to create each silkscreen stencil for selectively applying the adhesive, which interrupts the otherwise digital process. The interruption significantly lowers the productivity of the operation and adds to the time and expense involved in any changeover between graphic designs. The apparel industry is increasingly requiring exactly the opposite: quick-change low-inventory custom articles in small batches with low turnaround time. Using a wet coating and then drying it also requires additional energy, time, and equipment that can reduce the throughput of the manufacturing process. Additionally, the offline screen manufacturing process is highly reliant on environmentally damaging chemicals. Increasingly customers and brands are seeing value in reducing the environmental impact of their products.

Alternatively, instead of being applied in-register to the graphic, the thermal adhesive can be 'flood-coated' across the whole transfer sheet with the drawback that the adhesive in the unprinted areas will be transferred to the apparel or merchandise along with the desired graphic. The excess adhesive is undesirable as the exposed adhesive can activate in the drier and ruin garments, decrease the comfort when wearing the garment, and may discolor in the wash.

Newer high speed electrophotographic printing methods have evolved, such as the HP Indigo® proprietary liquid electrophotography system, to print the graphic. Liquid electrophotographic (LEP) uses 1-2 micron toner particles suspended in a hydrocarbon-based carrier, such as an isoparaffinic liquid (e.g., ISOPAR®). The toner particles are comprised of microscopic pigments trapped within a resin. One advantage of the HP Indigo LEP over dry toner electrophotographic processes is that the LEP process applies a continuous flexible film of toner to the substrate where dry toner methods result in discrete brittle particles of toner that are less durable to abrasion in certain circumstances, such as wash durability. However, present methods using the LEP method to produce heat transfers must also rely on screen printed polymeric coating intermediaries to hold any thermal adhesive in-register to the printed graphic. The production of screens is an inefficient process for small quantities, and the associated clean up and reuse of screens produces undesirable environmental harmful waste byproduct that must be disposed.

High speed inkjet color printers that can provide resolution required for photographic images, such as the Mimaki SWJ 320 EA and Oric Jet Powder System, are much slower and capable of only a fraction of the output of LEP printers. All other known forms of direct to garment printing are even slower.

Until now heat transfer manufacturers have not determined a successful process to provide a fully digital transfer with the thermal adhesive applied in-register, and are therefore held hostage to the aforementioned inefficiencies, prompting large minimum purchase requirements. To avoid these large minimums companies can request a set up charge for small order quantities, which is also undesirable for the customer. Significant time and production overhead could be saved if adhesive could be applied in-register to the printed graphic as a step in a fully-digital printing process One attempt to do this employs a laser printer to print toner onto a sheet. This method then presses an adhesive coated paper to the print where the adhesive only sticks to the digitally printed areas, and then use those layers in conjunction with an opaque layer as the final transfer decoration. See, U.S. Pat. No. 8,236,122 to Kronzer. Generally, the laminating conditions used in this process have very small tolerances that are not necessarily achievable on a regular basis. Additionally, the processing time to adhere the adhesive to the print is substantial, on the order of 30 seconds per sheet, which cannot compare to the speed of production of a high-speed laser printing. This still produces an inferior product that will produce cracks in the graphic when stretched or washed after a few cycles.

Another alternative method involves the deposition of adhesive on a release substrate. The deposited adhesive is then pressed in a secondary process offline to the printing process onto the toner-based print which is printed onto its own release liner. See, for example, U.S. Pat. No. 9,227,451 issued Jan. 5, 2016 to Dolsey. This secondary process is also more time consumptive.

Another alternative fully-digital heat transfer manufacturing method involves printing an image directly onto a hot melt adhesive layer. See, U.S. Pat. No. 11,130,364 issued Sep. 8, 2021 to McGovern et al. However, there are two significant drawbacks to this method. The first is that it requires laser kiss-cutting through the adhesive layer to separate the desired graphic from the adhesive film. This process step is expensive and can be limiting for certain designs. The second drawback is that any adhesive outside of the graphic is wasted. In sum, this process is not ideal for reduction in material waste, to optimize cost and environmental performance.

What is needed is a method of digitally printing a graphic and digitally applying a viscoelastic binder in-register at a high speed to the printed graphic which subsequently provides registered accumulation of powdered adhesive. The process described efficiently produces a single unique-graphical hot transfer, without significant waste, that is well suited for customization of apparel and soft goods.

SUMMARY OF THE INVENTION

It is, therefore, an object of the present invention to provide a fully-digital-printed heat transfer with photographic quality image capability and method of manufacture, to meet the needs of the market for smaller order quantities and even customized heat transfers produced in a more environmentally friendly way.

It is yet another object of the present invention to provide a heat-sealable applique/transfer that resembles a traditional, layered appliqué often used for lettering and numbering on sports jerseys and uniforms that is wash durable and performance capable for that market.

It is another object of the present invention to provide a heat-sealed applique/transfer that can be manufactured cost effectively and provide a flexible, stretchable durable product.

The subject matter described and claimed here in one embodiment is a process for producing a digital printed heat transfer comprising the steps of: on a substrate having a release layer coated on one side: 1) applying a primer to the coated side of the release substrate, 2) digitally-printing electrophotographic toner within a defined region atop the primer layer on the release side of the substrate to define a graphic within the defined region inclusive of both printed and unprinted areas; 3) digitally printing a tacky viscoelastic binder in registration with the printed areas of the digitally-printed graphic; 4) applying a powder adhesive to the defined region of said substrate; 5) removing loose powder adhesive that does not adhere to the defined regions of said graphic; and 6) fusing and bonding the adhesive to the digital printed graphic. The binder precisely secures the adhesive powder to the printed graphical areas. The result is then cooled to set the image for use as a heat transfer.

Illustrations are provided to disclose aspects of the invention and are described herein. These aspects describe but a few of the ways in which the principles disclosed herein can be applied and is intended to include all aspects and similar or equivalent methods or steps.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is process for producing a thermal or "hot" transfer by a multi-stage print process comprising the steps of: 1) obtaining a substrate having a release layer coated on one side; 2) applying a primer suitable for toner to the release layer, 3) electrophotographically printing a toner within a defined region of the coated release side of the substrate to define a graphic within the defined region inclusive of both printed and unprinted areas; 3) digitally printing a tacky viscoelastic binder onto the digital printed graphic layer in registration therewith and only on the printed areas of the defined region; 4) applying a powder adhesive to the defined region of said substrate; 5) removing loose powder adhesive that does not adhere to the tacky viscoelastic binder; and 6) fusing and bonding the adhering thermal adhesive powder to the digital printed graphic by the application of heat via infrared lamps or heated rollers or a combination thereof. Note that the tacky viscoelastic binder temporarily and precisely secures the adhesive powder to the digital print, while excess adhesive powder is removed and recycled. After curing the resulting image is then cooled to set the image for use as a heat transfer. The process produces multi-color photographic quality heat transfers, that are stretchable and flexible so that they are suitable for the apparel and soft goods industries. With reference to the drawings, the digitally printed heat transfer and method of manufacture is disclosed in more detail.

Figure 1:
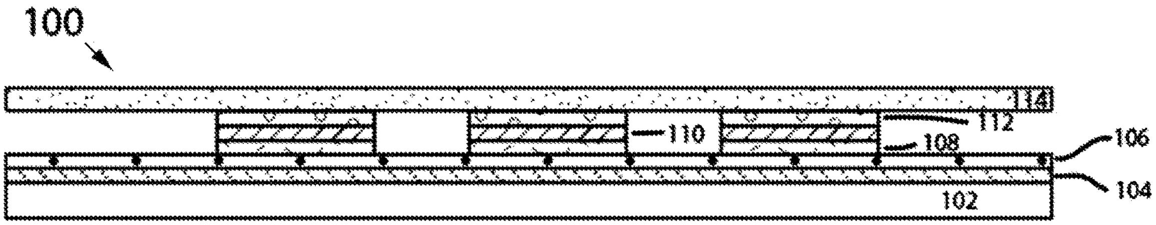
FIG. 1 illustrates a schematic cross-sectional view of the preferred embodiment of a digitally produced heat transfer produced using the described method of production.

Referring initially to the drawings, FIG. 1 illustrates a fully-digitally-produced heat transfer 100. The heat transfer 100 generally comprises a carrier or substrate 102 having a release layer 104 applied to one side, and a primer 106 applied to the release layer 104 for enhancing adhesion of, and protection of, the liquid electrophotographic (LEP) toner applied to the release layer 104. The primer 106 is preferably a polymeric coating or film composition that includes (i) an adhesion-promoter having acidic or basic reactive components, such as acrylic acids or amines to enhance adhesion of the electrophotographic toner to the substrate 102, (ii) a resin, either polyvinyl acetal and/or acrylic polyol, and isocyanate to protect the electrophotographic toner printed thereon. The primer 106 must appear clear as it is present above the printed image 108 in the final transfer product and as such should not be considered an ink. In some embodiments, primer 106 may be applied sequentially, e.g., a protective resin separately applied to the release coating 104 prior to an adhesion promoter. The purpose of the protective coating is to increase the durability of the heat transfer, and more specifically to increase its wear resistance. Some examples of suitable protective coatings are Michelman's DigiGuard Gloss 115 or Actega's WVH011854.

The heat transfer 100 also generally comprises a fully-digital-electrophotographically printed image 108 printed by a first electrophotographic printer within a defined region of the substrate 102 atop the primer 106, and configured to define one or more graphics and/or text. The printed image 108 consists of discontinuous printed areas of electrophotographic toner atop primer 106, adjoined by unprinted areas of exposed primer 106 having no printed electrophotographic toner. These printed and unprinted areas of the printed image can define printed and unprinted areas of the primer layer 106. Next, a binder 110 is precisely printed by a second drop-on-demand printer onto the printed image 108 only in the printed regions. Drop-on-demand (DOD) printing uses a head that only releases droplets when being triggered, either by thermal or piezoelectric effect. Despite using alternative printers and print techniques, the adhesive binder 110 and the printed image 108 are printed from copies or derivations of the same digital image file, such that discontinuous printed areas exist of adhesive binder 110 atop LEP toner 108 atop toner primer 106 in registration, adjoined by unprinted areas of exposed toner primer 106 having no printed adhesive binder 110 or printed LEP toner 108.

For the binder 110 to be digitally-printable it must be within a prescribed printable viscosity range (lower is better), yet viscous enough after application so that when powderized adhesive 112 (per below) is blown off the binder 110 does not shift (higher is better). If the binder 110 shifts the powder adhesive 112 will not stay in register with the printed EP toner layer. Jetting of high-viscosity solutions in excess of 200 cps have been achieved, but standard inkjet printers typically operate in a lower and relatively narrow viscosity range. For purposes of drop on demand printing the binder 110 should be less than 250 cps and preferably in the viscosity range of 6 to 50 cps between the temperature of 68 F 120 F, as measured by Brookfield viscometer with spindle #1 at 12 rpm. After application the Dahlquist criterion should hold within a range of from 60° F. to 130° F., namely, to be considered tacky at the low shear rates in this powder application process (~1 HZ or less), the storage modulus should be less than 0.3 MPa and shear modulus preferably less than 0.1 MPA. A simpler alternative test to determine whether a viscoelastic material is tacky enough to be considered suitable as the binder layer 110 is to apply powderized adhesive 112 to the binder layer 110 and, before any additional fixing, lightly shake the transfer with the powder 112 face down. A suitable binder 110 material will retain enough adhesive powder 112 to adhere strongly to soft goods, preferably at least 10 $N/cm^2$ and more preferably at least 30 $N/cm^2$. It is important that the viscoelastic nature of the binder 110 allows for elastic stretch and recovery after it is cured with the powdered adhesive 112 to the electrophotographic toner 108 and applied to the final product. The combined cured binder 110 and powdered adhesive 112 layer should be able to stretch and fully recover at least at 2% strain, and preferably at 10% strain. Optimally these combined layers can elastically stretch at least to 50% strain and fully recover. The binder 110 remains effective even when as thin as 0.2 microns, or more preferably 0.75 microns, because its adhesion to the adhesive powder relies on surface forces rather than encapsulation of the powder unlike a layer of wet screen-printing ink which typically exceeds 85 microns. A thin binder layer is desirable to improve the flexibility of the transfer. Toward the foregoing, the binder 110 is primarily a resin selected from the group consisting of a polyvinyl acetate resin, ethylene-vinyl acetate resin, polyacrylic acid resin, or an isocyanate and a mixture thereof, with adhesion-promoting polar functional groups such as hydroxyls, carboxyls, and amines or amine functionalities, such as found in polyamides or polyethylene imine, and excipients, for example, ionized water, alcohol, a mixture of water and alcohol, an organic solvent, and/or an oil. The binder 110 contains no pigment and does not impact the final color of the image, and is therefore by definition not an "ink" or "toner", but merely a mechanism for adhering the powdered adhesive precisely and durably to the electrophotographic toner. The binder 110 should consist of at least 10% resin, more preferably in a range of from 20 to 90% resin, and optimally about 60%. The binder 110 will be significantly more effective at creating a durable product if it contains adhesion promoting additives to improve the adhesion between polyurethane adhesive 112 and the electrophotographic toner 108 as described above: polar groups such as hydroxyls, carboxylic acids, acrylic acids; or amine functionalities such as those found in polyamides or polyethylene imine. These polar groups interact with the polar groups in the electrophotographic toner 108 and form chemical bonds to improve adhesion. The binder 110 is chemically compatible with the toner and remains tacky after application in order to secure the powderized adhesive 112 described below.

Next, a powderized adhesive 112 is applied to the defined region of the substrate 102 and adheres only to the areas printed with tacky viscoelastic binder 110. Non-adherent powder adhesive 112 is removed. Typically, the powdered adhesive 112 is a polyurethane, a polyester or an olefin that can absorb oil, organic solvents, water, alcohol, and mixtures thereof. The HP Indigo LEP toner for example is compatible with oil (the toner itself is dispersed in synthetic isoparaffin solvent (Isopar™). Adhesion of the adhesive powder 112 to the printed electrophotographic toner 108 is improved by the addition of additives into the tacky viscoelastic binder layer 110 as described above.

The electrophotographic toner 108 is an acid acrylic resin that will react with these polar groups and allow for cross linking to occur. Other optional additives can be helpful in the binder 110 to assist with printing and curing. For example, additives such as viscosity modifiers help to provide the suitable viscosity for the printing process, surfactants help to provide a suitable wetting of the print substrate, and defoamers help to prevent the formation of foam, all as well known in the art. Further additives may be desirable to assist with cure, depending on the curing process for example UV cure, LED or IR. Secondary print in register to the graphic print has been achieved for UV varnishes utilizing the GEM™ system from HP Iindigo™, and MGI JETvarnish™ 3DS from Konica Minolta™. Varnishes of this type are brittle and not wash durable and will not function as a suitable binder.

DOD printing using a tacky viscoelastic binder in a process such as inkjet printing is required. In this application only one print head is required for the binder as it does not contribute to the color of the graphic. The DOD heads can be configured in an array to keep up with the speed of the laser printing technology. The DOD heads can be configured to print thin layers of the binder in the sub-micron range, while typical screen print methods would be limited to much thicker layers that exceed 85 microns.

As described below, the adhesive layer 112 can be applied by adhering adhesive powder to the sections of the transfer bearing printed binder 110, such that it temporarily binds thereto precisely in registration to the printed image 108, such that adhesive powder 112 only binds to each discontinuous binder 110 printed area, and no adhesive powder 112 binds outside adjoining unprinted binder 110 areas. Non-adhered adhesive powder 110 is removed, and the remaining adhesive powder 112 is then thermally fused to the digitally printed graphic 108 and binder 110.

Lastly, a protective release liner 114 may be temporarily applied over the adhesive powder 112 to protect the heat transfer during storage or transport. Protective release liner 114 may likewise be coated or laminated on one side with a release layer similar to layer 104.

Given the foregoing structure the heat transfer 100 may be applied to a base material. The base material can be made using a wide variety of textile fabrication methods known to the arts including wovens, nonwovens, and knits comprised of natural or synthetic fibers. Further the base material would typically be part of a clothing article or apparel such as tee shirts, jerseys, sweatshirts, outerwear, pants and slacks. More generally, heat transfers produced utilizing this method could be applied to soft goods such as apparel, home furnishings, signage such as banners and flags, luggage, back packs, and automotive interiors. Before the heat transfer 100 is applied to an article the protective release liner 114 if present is peeled away exposing the adhesive layer 112, and the adhesive layer 112 is put in direct contact with (i.e. is directly adjacent to) the exterior surface of the article. Heat and pressure can be applied to the heat transfer 100 to bind the adhesive layer 112 to the surface of the article, after which the carrier substrate 102 is removed. Upon removal of the carrier substrate 102 the primer 106 will retain at least a portion of the release coating 104, which separates from the carrier 102, and the release coating 104 defines the outer most layer of heat transfer 100 after application to the article.

After fusing and heat transfer onto an article of apparel, the digitally printed graphic 108, binder layer 110 and applied powder adhesive 112 ideally have a proportional limit above 2% engineering strain, plus an ability to elongate within a general range of 10% to about 50% or more depending on articles of apparel. One skilled in the art should understand that certain combinations of digital printed graphic methods such as HP Indigo's process would provide such suitable range of elongation. This elongation enhances product durability in wash by accommodating the flexing and bending of soft goods during laundering. Outerwear and home furnishings and bags by comparison would generally have a proportional limit above 1% strain, and an ability to elongate at least about 5% and could work with electrophotographic dry toner print systems such as those by Xeikon®2050Rex or CX500 or ink jet printer pigment inks. Those systems by comparison crack with substantial elongation. One skilled in the art could utilize such systems by breaking larger graphics up into smaller dots to comprise the image to minimize the degree of elongation around an individual printed matrix. This may necessitate the need for digital application of the adhesive or binder for binding the adhesive precisely to the printed element. A viscoelastic binder utilized with these printers would also enhance product durability.

Figure 2:
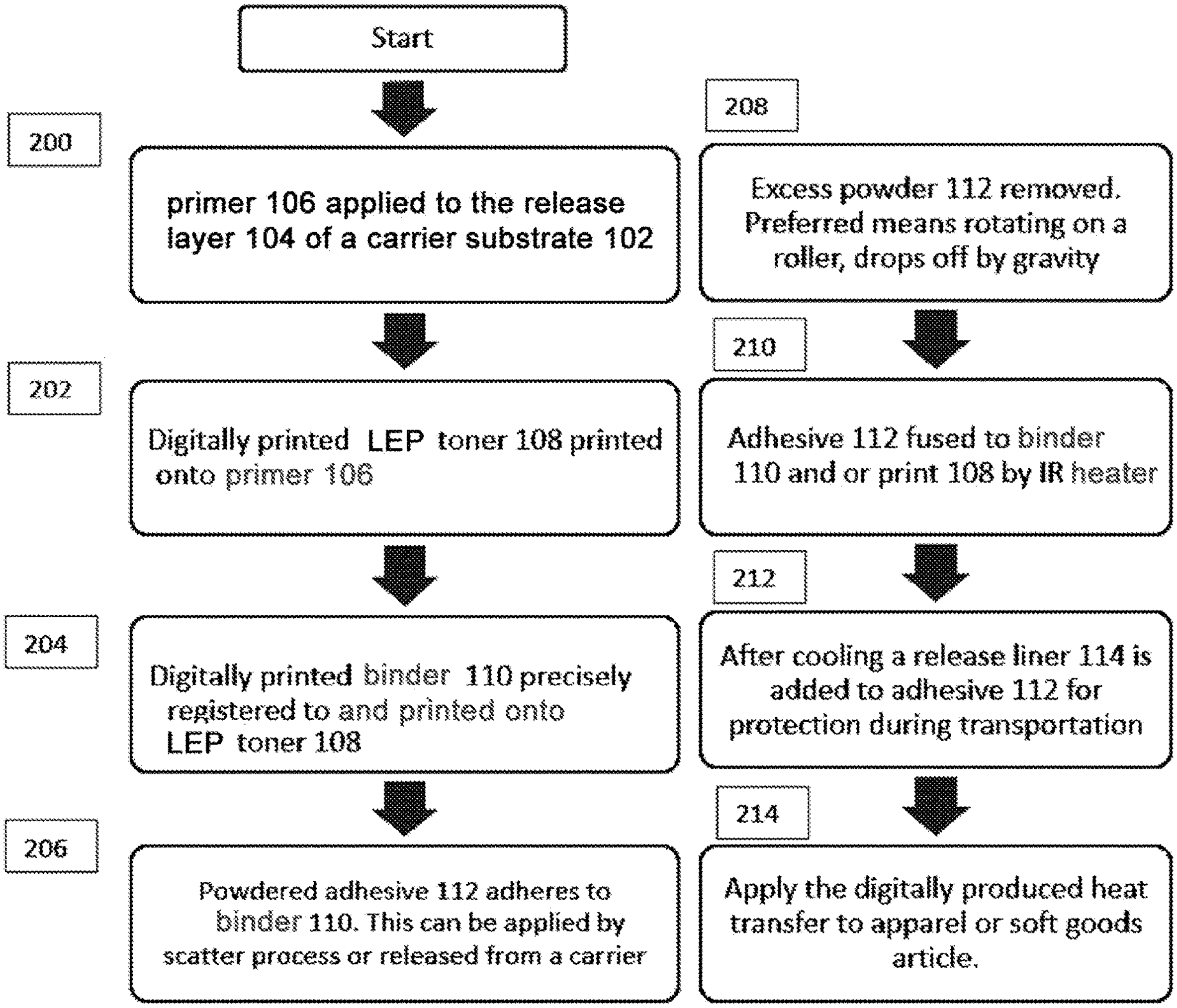
FIG. 2 illustrates a workflow of manufacture for a digitally produced heat transfer in accordance with the present method.

FIG. 2 illustrates the method for manufacturing the heat transfer 100 by digital techniques. The process begins with a section of carrier substrate 102 coated or laminated on one side with a release layer 104. Preferably, a semi-opaque or translucent carrier layer 102 is obtained that is already pre-coated with a release layer 104 on one side in either roll or sheet form. The carrier 102 may be cellophane, mylar, coated paper, polypropylene, polyester or the like. Release layer 104 is preferably coated or laminated directly on top of carrier substrate 102. Release layer 104 can be a release material that separates from the carrier substrate 102. Release layer 104 is preferably a commercially-available "wax" or "non-wax" and "non-silicone" release layer a variety of which are commercially available from, for example, Mayzo, Inc. of Suwanee, Ga.

At step 200 primer 106 suitable for electrophotographic toner is applied on top of the release layer 104. The release layer 104 preferably includes or can be modified to include a protective coating such as a polyacrylate or polyurethane The primer 106 functions to chemically adhere the electrophotographic toner 108 to the release layer 104 on the substrate102. Suitable primers 106 include PrintRite™ available from Lubrizol® or Michelman primers such as Michem® In-Line Primer 030 or DigiPrime® 680.

At step 202 a digital printed electrophotographic toner 108 is applied to the primer 106 using electrophotographic digital printing from a digital-based image. At step 204 a binder 110 is then digitally printed onto the digitally printed graphic 108 in registration therewith. For example, a digital DOD printer can precisely (+/−0.5 mm) print the binder 110 onto the printed area of the protective coating. In this manner, the digital printer prints binder 110 substantially onto all of the printed graphic and does not print binder 110 substantially onto any of unprinted area of the protective coating.

At step 206 an adhesive powder 112 is applied to the binder 110 by means of scatter powder coating, direct transfer on a carrier, or by any other suitable means of powder deposition. The adhesive powder is preferably a thermally activated adhesive that can be polyester, polyurethane, polyolefin or polyamide based. The adhesive powder 112 adheres to the binder 110 but only to the binder 110, not adjacent or surrounding areas. For example, the adhesive powder does not adhere to the carrier layer 102, the release layer 104, or the primer layer 106. Thus, in effect, the adhesive powder 112 forms a top layer over the printed areas of binder 110 atop the toner 108 and in registration therewith.

At step 208 any excess powder is removed from the unprinted surface areas of the binder layer 110 by gravity when rotated around a roller or by any other suitable means such as mechanical vibration, blowers, or brushes. The powder recovered in step 208 is preferably recycled for later use.

At step 210 the remaining adhesive 112 on the digitally printed areas of 108 and 110 is more permanently bonded, such as by curing, and/or fusing using heat from infrared IR lamps, ovens, heated rollers, or UV and or LED curing and/or other methods known in the art. The now-bonded adhesive 112 lies in registration over the binder 110 and toner 108. After cure the binder 110 will have a significant quantity of residual components still present to promote adhesion between the digitally printed areas 108 and adhesive layer 112 after the completion of step 210.

At step 212 the transfer is cooled below the melt point of the adhesive powder or more preferably to room temperature and a protective release liner 114 can be applied. Normal application of the digitally-produced heat transfer 100 occurs at step 214. The digitally-produced heat transfer 100 may be applied to any article of apparel or soft goods made from textiles. One skilled in the art should understand that the above-described heat transfer 100 can be made and sold in roll form or sheet form and subsequently cut to size. Application equipment can include heat transfer presses made by George Knight model DK20SP or Stahl's Fusion® heat press.

The process described above offers a more efficient method of digitally printing a hot transfer. The process described can efficiently produce a single unique graphical transfer or rolls or sheets of same. The heat transfers produced are well suited for customization of apparel and soft goods.

The method would replace processes utilizing screens to apply polymeric coatings and adhesives thus simplifying production. By utilizing high speed digital printing of the binder the time consumptive changeover processes are eliminated as well as waste and environmental chemical disposal issues.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A process to create printed heat activated transfers for application to soft goods, comprising the steps of:

obtaining a substrate having a release layer pre-coated on one side;

applying a primer to the coated side of the substrate;

digitally printing a graphic onto said primer within a defined region of the substrate using a first printer configured to print electrophotographic toner and pursuant to a digital image file, the graphic comprising both printed and unprinted areas;

digitally printing a tacky viscoelastic binder having a storage modulus of less than 0.3 MPa and a shear modulus of less than 0.1 MPa within a temperature range of 60° F. to 130° F. onto and in registration with the printed areas of said graphic using a second DOD printer that is drop-on-demand (DOD) and pursuant to a copy of said digital image file, wherein the binder has a thickness of 0.2 to 0.75 microns;

forming an adhesive layer by applying powdered adhesive, whereupon some of the powdered adhesive adheres directly to the printed tacky viscoelastic binder and in registration therewith;

removing powdered adhesive applied to the unprinted areas that does not contain binder; and thermally curing the adhering adhesive.

2. The process of claim 1, further comprising the step of applying a protective sheet over the adhesive layer.

3. The process of claim 1, further comprising the step of applying a protective coating onto the release layer.

4. The process of claim 1, wherein a release layer is applied to the substrate prior to the primer.

5. The process of claim 1, wherein the polymeric adhesive powder is cured by any one of an LED, UV, or IR lamp.

6. The process of claim 1, wherein the powder adhesive is cured by a heated roller.

7. The process of claim 1, wherein the powder adhesive is cured in an oven.

8. The process of claim 1, wherein the tacky viscoelastic binder has a viscosity of less than 250 cps.

9. The process of claim 1, wherein the tacky viscoelastic binder comprises at least 10% resin.

* * * * *